(12) United States Patent
Atkinson

(10) Patent No.: US 10,162,399 B2
(45) Date of Patent: *Dec. 25, 2018

(54) POWER SUPPLY VOLTAGE AND LOAD CONSUMPTION CONTROL

(71) Applicant: HEWLETT-PACKARD DEVELOPMENT COMPANY, L.P., Houston, TX (US)

(72) Inventor: Lee Warren Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,711

(22) Filed: Jun. 2, 2017

(65) Prior Publication Data

US 2017/0269679 A1  Sep. 21, 2017

Related U.S. Application Data

(63) Continuation of application No. 14/766,824, filed as application No. PCT/US2013/029255 on Mar. 6, 2013, now Pat. No. 9,703,367.

(51) Int. Cl.
  *G06F 1/26* (2006.01)
  *G06F 1/32* (2006.01)
  *G05F 5/00* (2006.01)

(52) U.S. Cl.
  CPC .  *G06F 1/26* (2013.01); *G05F 5/00* (2013.01)

(58) Field of Classification Search
  None
  See application file for complete search history.

(56) References Cited

U.S. PATENT DOCUMENTS

| 6,172,884 B1 | 1/2001 | Lanni |
| 7,035,126 B1 | 4/2006 | Lanni |
| (Continued) | | |

FOREIGN PATENT DOCUMENTS

| CN | 1989477 A | 6/2007 |
| CN | 101345488 | 1/2009 |
| (Continued) | | |

OTHER PUBLICATIONS

European Patent Office, Extended Search Report for EP 13877005 dated Sep. 16, 2016 (10 pages).

(Continued)

*Primary Examiner* — Thomas C Lee
*Assistant Examiner* — Zhipeng Wang
(74) *Attorney, Agent, or Firm* — HP | Patent Department

(57) ABSTRACT

In some examples, a power adapter includes a voltage regulator, first and second resistors, a switch to alternately connect the first and second resistors to a signal node coupled to a load circuit external of the power adapter, and a voltage controller to control the switch to set a first mode of operation, and responsive to the switch setting the first mode of operation, determine a power requirement of the load circuit, and control the voltage regulator to provide a supply voltage to a power node in accordance with the power requirement of the load circuit, and control the switch to set the second mode of operation that causes the load circuit to determine a power rating of the power adapter and to operate a load of the load circuit according to the power rating of the power adapter.

18 Claims, 4 Drawing Sheets

(56) References Cited

U.S. PATENT DOCUMENTS

| | | | |
|---|---|---|---|
| 7,345,451 B2 | 3/2008 | Chen | |
| 7,581,130 B2 | 8/2009 | Carroll | |
| 7,902,800 B2 | 3/2011 | Jain et al. | |
| 8,009,451 B2 | 8/2011 | So | |
| 9,703,367 B2 * | 7/2017 | Atkinson | G06F 1/3296 |
| 2005/0102043 A1 | 5/2005 | Menas et al. | |
| 2009/0278407 A1 | 11/2009 | Tupman et al. | |
| 2011/0156483 A1 | 6/2011 | Caraghiorghiopol et al. | |
| 2012/0161743 A1 | 6/2012 | Chi et al. | |
| 2013/0038142 A1 | 2/2013 | Sawyers | |

FOREIGN PATENT DOCUMENTS

| | | |
|---|---|---|
| CN | 101872230 | 10/2010 |
| CN | 102035410 A | 4/2011 |
| JP | 2008-178194 A | 7/2008 |
| WO | WO-2006093560 A1 | 9/2006 |
| WO | WO-2012018333 | 2/2012 |

OTHER PUBLICATIONS

Hidekazu Miwa et al., "Low Cost Universal Battery Charger for Wide Range Input Voltage and Wide Range Output Voltage in Portable Applications," Jun. 15-19, 2008, pp. 4699-4704, IEEE.
International Search Report and Written Opinion, International Application No. PCT/US2013/029255, dated Nov. 28, 2013, pp. 1-8.

* cited by examiner

400

| PROGRAMMING RESISTOR | REQUIRED DEVICE VOLTAGE |
|---|---|
| 4.7K OHMS | 5 VOLTS |
| 10K OHMS | 9 VOLTS |
| 22K OHMS | 12 VOLTS |
| 33K OHMS | 15 VOLTS |
| 47K OHMS | 19 VOLTS |

| POWER CAPACITY RESISTOR | ELECTRICAL ADAPTER CAPACITY |
|---|---|
| 4.7K OHMS | 5 WATTS |
| 10K OHMS | 15 WATTS |
| 22K OHMS | 20 WATTS |
| 33K OHMS | 40 WATTS |
| 47K OHMS | 70 WATTS |

FIG. 5

POWER SUPPLY VOLTAGE AND LOAD CONSUMPTION CONTROL

CROSS REFERENCE TO RELATED APPLICATIONS

This is a continuation of U.S. application Ser. No. 14/766,824, having a national entry date of Aug. 10, 2015, which is a national stage application under 35 U.S.C. § 371 of PCT/US2013/029255, filed Mar. 6, 2013, which are both hereby incorporated by reference in their entirety.

BACKGROUND

Electrical power adapters are used to convert alternating-current into regulated direct-current for use with laptop computers, cellular telephones and other load devices. A load device draws current provided by the adapter. The present teachings address the foregoing concerns.

BRIEF DESCRIPTION OF THE DRAWINGS

The present embodiments will now be described, by way of example, with reference to the accompanying drawings, in which:

FIG. 4 depicts a table of illustrative resistor values according to one example;

FIG. 5 depicts a table of illustrative resistor values according to another example.

DETAILED DESCRIPTION

Introduction

Examples of electronic circuits and corresponding methods are provided. A power adapter is coupled to load device such that a power node and a signal node and a ground node are common to both entities. A regulated supply voltage is provided by the power adapter to the load device in accordance with a voltage sensed at the signal node. Electrical current drawn by the load device is limited in accordance with a voltage sensed at the signal node.

In one embodiment, an electronic circuit includes a power circuit having one or more resistors either directly or selectively coupled to a signal node. The power circuit also includes a voltage controller to detect a voltage at the signal node and to provide a corresponding voltage control signal. The power circuit includes a voltage regulator to provide a supply voltage to a power node in accordance with the voltage control signal. The electronic circuit also includes a load circuit to be removably coupled to the signal node and the power node. The load circuit includes a programming resistor coupled between the signal node and a ground node. The load circuit also includes a load controller to sense a voltage at the signal node and to provide a corresponding load control signal.

In another embodiment, a system includes a computer including a load controller. The system also includes a power adapter having a power node and a signal node and a ground node each to be disconnectably coupled to the computer. The power adapter is configured to detect a voltage at the signal node and to provide a corresponding supply voltage at the power node. The load controller is configured to detect a voltage at the signal node and to provide a load control signal. The load control signal causes the computer to limit current drawn from the power adapter.

In yet another embodiment, a method includes coupling one or more resistors within an adapter, one at a time, into series relationship with a programming resistor within a load entity. The method also includes sensing one or more voltages at a signal node common to the adapter and the load entity. The method further includes providing a regulated source voltage from the adapter to the load entity in accordance with at least one of the sensed voltages. The method also includes limiting electrical current drawn by the load entity in accordance with at least one of the sensed voltages.

First Illustrative System

Figure 1:
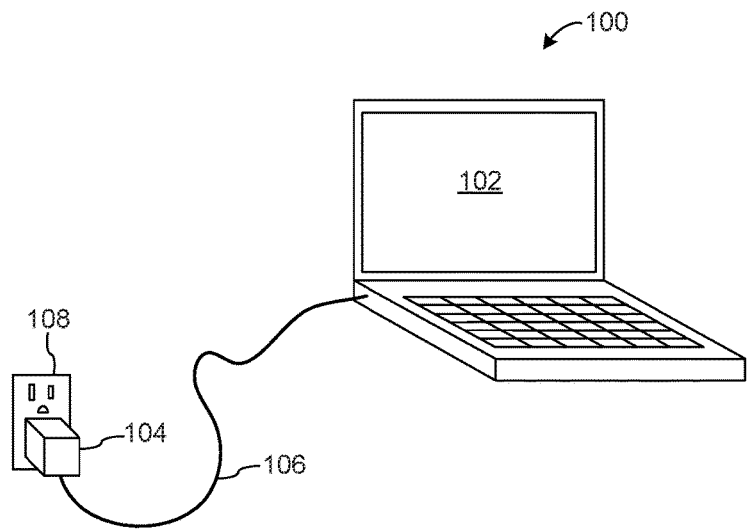
FIG. 1 depicts a diagrammatic view of a system according to one example.

Reference is now directed to FIG. 1, which depicts a diagrammatic view of a system 100. The system 100 is illustrative and non-limiting with respect to the present teachings. Thus, other systems can be configured and/or operated in accordance with the present teachings.

The system 100 includes a laptop computer (laptop) 102. The laptop 102 can be defined by any such device that includes electronic circuitry according to the present teachings. The laptop 102 receives voltage-regulated, direct-current (DC) power from an electrical adapter (power adapter, or power circuit) 104 by way of a connecting cable 106. In turn, the electrical adapter 104 is connected to a source 108 of alternating-current (AC) power. The electrical adapter 104 includes circuitry according to the present teachings.

Illustrative operation of the system 100 is as follows: the electrical adapter 104 receives AC power from the source 108. The electrical adapter 104 assumes a first mode during which a first voltage signal is detected by the electrical adapter 104 and correlated to a voltage requirement of the laptop (i.e., load device) 102. The electrical adapter 104 then provides regulated DC power of the corresponding voltage to the laptop 102 by way of the connecting cable 106.

The electrical adapter 104 assumes a second mode during which a second voltage signal is detected by circuitry of the laptop 102 and correlated to operate according to a maximum power (or electrical current) capacity for the electrical adapter 104. The power rating can optionally be a continuous operating maximum or a temporary (e.g., ten seconds, etc.) operating maximum. The determined power rating is then used by the laptop 102 in regulating its own operations (i.e., current draw) to within the power output capability or limit of the electrical adapter 104.

First Illustrative Embodiment

Figure 2:
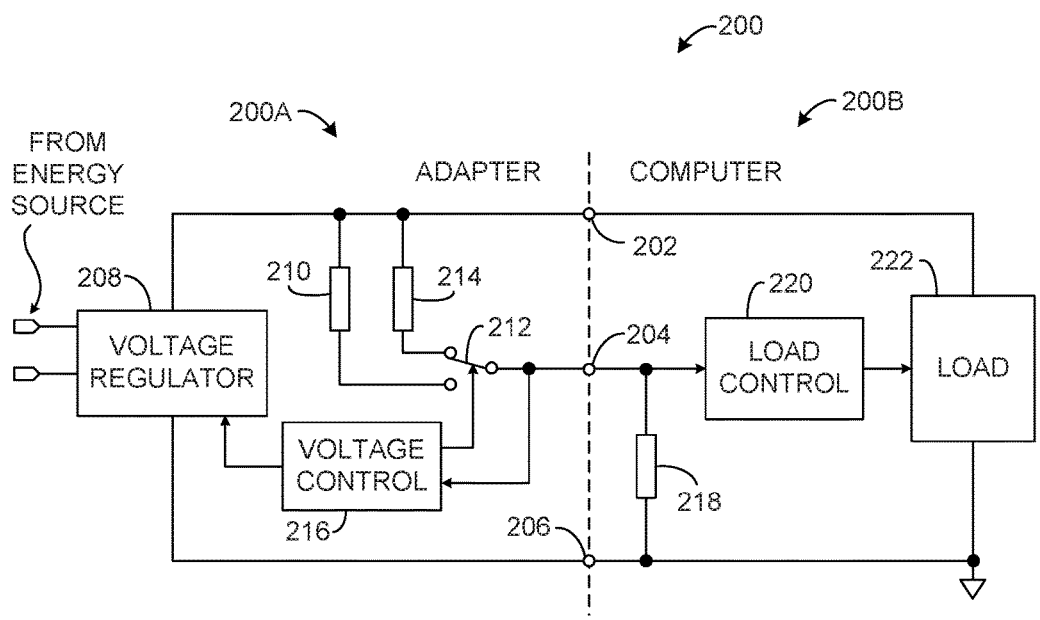
FIG. 2 depicts a schematic diagram of circuitry according to one example.

FIG. 2 is a schematic diagram depicting circuitry 200 according to an embodiment of the present teachings. The circuitry 200 is illustrative and non-limiting in nature. Other circuitry consistent with the present teachings is also contemplated. The circuitry 200 includes a portion 200A that is provided (i.e., supported or housed) within an electrical adapter (ADAPTER), and a portion 200B that is provided within a laptop computer (COMPUTER). Thus, the circuitry 200 is as depicted when an electrical adapter (e.g., 104) is (removably) coupled to a laptop computer (e.g., 102) or other load device in accordance with the present teachings.

The circuitry portions 200A and 200B are referred to as "compatible" with each other by virtue of their cooperative configurations. Thus, the electrical adapter portion 200A is compatible with the laptop computer (or load) portion 200B, and vice versa.

The circuitry 200 includes a power node 202, a signal node 204 and ground node 206. During normal operation, a regulated direct-current voltage is provided between the nodes 202 and 206. The adapter portion 200A includes a voltage regulator 208 to provide a selectable (adjustable), regulated supply voltage between the power node 202 and the ground node 206. The voltage regulator 208 is controllably adjusted by way of voltage control signal described hereinafter. The voltage regulator 208 can be defined, at least in part, by a switching-type regulator, a linear-type regulator, or other suitable voltage control circuitry. The voltage regulator 208 is configured to be coupled to a source of electrical energy such as a line-level utility supply (e.g., one-hundred twenty volts AC).

The adapter portion 200A also includes a resistor 210 coupled (or connected) to the power node 202. The resistor 210 is also referred to as a biasing resistor 210 for purposes herein. The biasing resistor 210 can be selectively coupled to the signal node 204 by way of a switch 212. In one example, the biasing resistor 210 is characterized by an electrical resistance of 10.0K Ohms. Other suitable resistance values can also be used.

The adapter portion 200A also includes a resistor 214 coupled (or connected) to the power node 202. The resistor 214 is also referred to as a power capacity resistor 214 or power resistor 214 for purposes herein. The power capacity resistor 214 can be selectively coupled to the signal node 204 by way of the switch 212. The power capacity resistor 214 is characterized by an electrical resistance value that corresponds to a power provisioning capacity or current supplying capacity of the adapter portion 200A. Illustrative resistance values and corresponding electrical adapter (e.g., 104) capacities are described hereinafter.

The adapter portion 200A further includes a voltage controller 216. The voltage controller 216 is configured to detect (monitor, or sense) a voltage signal present at the signal node 204 and to correlate that signal with a voltage requirement of the laptop computer 200B. The voltage controller 216 is also configured to provide a voltage control signal to the voltage regulator 208 causing it to provide a supply voltage at the node 202 corresponding (equal, or about equal) to the voltage requirement of the laptop computer 200B. Furthermore, the voltage controller 216 is configured to selectively control the switch 212 so as to selectively couple either the biasing resistor 210 (i.e., first mode) or the power capacity resistor 214 (i.e., second mode) to the signal node 204.

The voltage controller 216 can be defined by or include any suitable electronic constituency. Without limitation, the voltage controller 216 can be at least partially defined by an application specific integrated circuit (ASIC), a microcontroller, a microprocessor, analog or digital or hybrid circuitry, and so on. Other elements or configurations can also be used.

The computer portion 200B of the circuitry 200 includes a resistor 218 that is connected between the signal node 204 and the ground node 206. The resistor 218 is also referred to as a programming resistor 218 for purposes herein. The programming resistor 218 is characterized by an electrical resistance value that corresponds to a voltage requirement of the computer portion (i.e., load entity or device) 2006.

The computer portion 200B also includes a load controller 220. The load controller 220 is configured to detect a voltage signal present at the signal node 204 and to correlate that signal with a power (or current) provisioning capacity of the adapter portion 200A. The load controller 220 is also configured to provide a load control signal causing a load device (entity, or circuitry) 222 to limit its power consumption (i.e., current draw) from the adapter portion 200A in accordance with the adapter capacity. The load controller 220 is configured such that the power capacity signal is detected when the power capacity resistor 214 is coupled to the signal node 204. (i.e., during the second mode).

The load controller 220 can be defined by or include any suitable electronic constituency. Without limitation, the load controller 220 can be at least partially defined by an application specific integrated circuit (ASIC), a microcontroller, a microprocessor, analog or digital or hybrid circuitry, and so on. Other elements or configurations can also be used.

The computer portion 200B further includes the load device 222 introduced above. The load device 222 is coupled to receive operating power from the power node 202 and the ground node 206. The load device 222 can be variously defined and can include a motherboard of a laptop computer, a peripheral or peripherals of a computer, an electronic display, data acquisition circuitry, control instrumentation, and so on. Other load devices 222 can also be defined and used. The load device 222 is configured to perform various operations in accordance with its respective normal functions. The load device 222 is also configured to control (throttle, or modulate) its operations, or intensities of those operations, in accordance with the load control signal from the load controller 220. Electrical current draw (power consumption) by the load device 222 is thus limited or constrained within the power provisioning capacity of the adapter portion 200A.

The circuitry 200 includes resistors 210, 214 and 218 as described above, the respective resistive values of which serve to establish (communicate, or program) required voltage and power capacity parameters for normal operations of the adapter portion 200A and the computer portion 200B, respectively. However, the present teachings also contemplate that respective elements characterized by electrical impedance (i.e., resistance and/or reactance) can also be used to establish operating parameters for the adapter portion 200A and the computer portion 200B. Thus, inductors, capacitors or other elements—as well as resistors—can also be used in functions analogous those of resistors 210, 214 and/or 218.

First Illustrative Method

Figure 3:
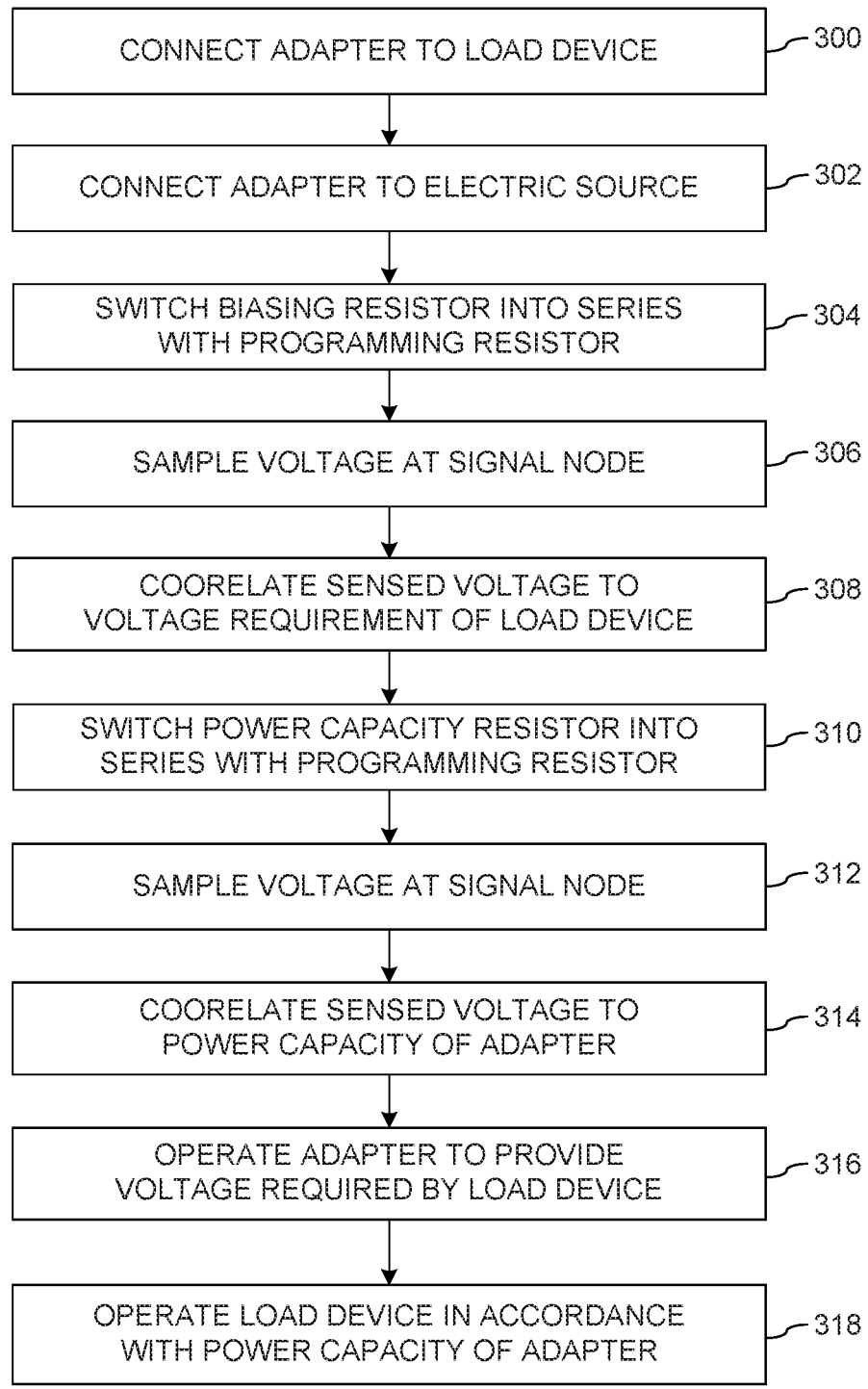
FIG. 3 is a flow diagram depicting a method according to one example.

FIG. 3 is a flow diagram depicting a method according to one embodiment of the present teachings. The method of FIG. 3 includes particular operations and order of execution. However, other methods including other operations, omitting one or more of the depicted operations, and/or proceeding in other orders of execution can also be used according to the present teachings. Thus, the method of FIG. 3 is illustrative and non-limiting in nature. Reference is also made to FIGS. 1-2 in the interest of understanding the method of FIG. 3.

At 300, an electrical adapter is connected to a load device. For purposes of illustrative and non-limiting example, it is assumed that the adapter 104 is connected to the laptop 102 by way of the cable 106. In another scenario, the load device can be a cellular telephone, video gaming console, etc. The power node 202, the signal node 204 and the ground node 206, respectively, are now electrically common to both the adapter 104 and the laptop 102.

At 302, the electrical adapter is connected to a source of electrical energy. For purposes of the ongoing example, the electrical adapter 104 is connected (i.e., plugged in) to the electrical source 108. The electrical adapter 104 is now coupled to provide regulated direct-current energy to the laptop 102 once electrical parameters have been communicated there between.

At 304, a biasing resistor is switched into series relationship with a programming resistor. For purposes of the example, the voltage controller 216 causes the switch 212 to couple the biasing resistor 210 to the signal node 204 and into series-circuit relationship with the programming resistor 218. A voltage divider is thus defined. The adapter 104 and the laptop computer 102 are operating in a "first mode" with respect to communicating with each other.

At 306, a voltage at the signal node is sampled. For purposes of the present example, a voltage across the programming resistor 218, which is present at the signal node 204, is sampled by the voltage controller 216. The voltage controller 216 digitally quantifies this voltage signal. The switch (or relay) 212 is in a "first mode" state during this step.

At 308, the sensed voltage is correlated to a voltage requirement of the load device. For purposes of the present example, the voltage controller 216 evaluates the digital quantification of the signal sampled at step 306 and determines that an operating voltage of nineteen volts (i.e., 19.0 Volts) is required by the laptop 102. The voltage controller 216 can make such determination by way of a lookup table, a predetermined mathematical function, or by another suitable technique.

At 310, a power capacity resistor is switched into series relationship with the programming resistor. For purposes of the present example, the voltage controller 216 causes the switch 212 to couple the power capacity resistor 214 to the signal node 204 and into series-circuit relationship with the programming resistor 218, defining a voltage divider. The adapter 104 and the laptop computer 102 are thus operating in a "second mode" with respect to communicating with each other.

At 312, a voltage at the signal node is sampled. For purposes of the present example, a voltage present at the signal node 204 is sampled by the load controller 220 and is digitally quantified. The switch (or relay) 212 is maintained in a "second mode" state during this step.

At 314, the sensed voltage is correlated to a power capacity of the electrical adapter. For purposes of the present example, the load controller 220 evaluates the digital quantification of the signal sampled at step 312 and determines that the adapter 104 can provide ninety watts (i.e., 90.0 Watts) of power. The load controller 220 can make such determination by way of a lookup table, a predetermined mathematical function, or by another suitable technique.

At 316, the adapter is operated to provide the voltage required by the load device. For purposes of the present example, the voltage controller 216 provides a voltage control signal to the voltage regulator 208, causing it to provide a regulated nineteen volts DC between the power node 202 and the ground node 206.

At 318, the load device is operated in accordance with the power capacity of the adapter. For purposes of the present example, the load controller 220 provides a load control signal to the load device 222 causing it to throttle or limit normal operations so as to consume ninety watts (or less) from the adapter 104. Such wattage limitations can also be considered (or implemented) in terms of limiting instantaneous current draw (e.g., 90.0 Watts/19.0 Volts=4.73 Amps (approx.) current limit).

The foregoing method is illustrative of any number of devices and methods contemplated by the present teachings. In general, and without limitation, an electrical adapter is connected to a computer or other load, and to a source of electricity. Circuitry within the electrical adapter and the load device now share a number of electrical nodes in common. A switching element couples a biasing resistor of the adapter into series with a programming resistor of the load device. A voltage present on a signal node is digitally quantified and correlated to a voltage requirement of the load device.

The switching element then couples a power capacity resistor into series with the programming resistor and a voltage present on the signal node is digitally quantified and correlated to a power provisioning capacity of the electrical adapter. The electrical adapter provides regulated electrical voltage consistent with the requirements of the load device. In turn, the load device limits or throttles its respective normal operations in accordance with the power capacity of the electrical adapter.

Illustrative Programming Resistor Values

Reference is made now to FIG. 4, which depicts a table 400 including illustrative and non-limiting examples of programming resistor values correlated to respective voltage requirements of a load device (e.g., 102). For example, a programming resistor (e.g., 218) having a value of 4.7K Ohms is correlated to a voltage requirement of 5.0 volts. In another example, a programming resistor having a value of 33K Ohms is correlated to a voltage requirement of 15.0 volts. Other resistance values correlated to other respective voltages can also be used.

Illustrative Power Capacity Resistor Values

Attention is turned now to FIG. 5, which depicts a table 500 including illustrative and non-limiting examples of power capacity resistor values correlated to respective power provisioning capacities of an electrical adapter (e.g., 104). For example, a power capacity resistor (e.g., 214) having a value of 10K Ohms is correlated to a power capacity of 15.0 Watts. In another example, a power capacity resistor having a value of 47K Ohms is correlated to a power capacity of 70.0 Watts, and so on. Other resistance values correlated to other respective power (or current) capacities can also be used.

Second Illustrative Embodiment

Figure 6:
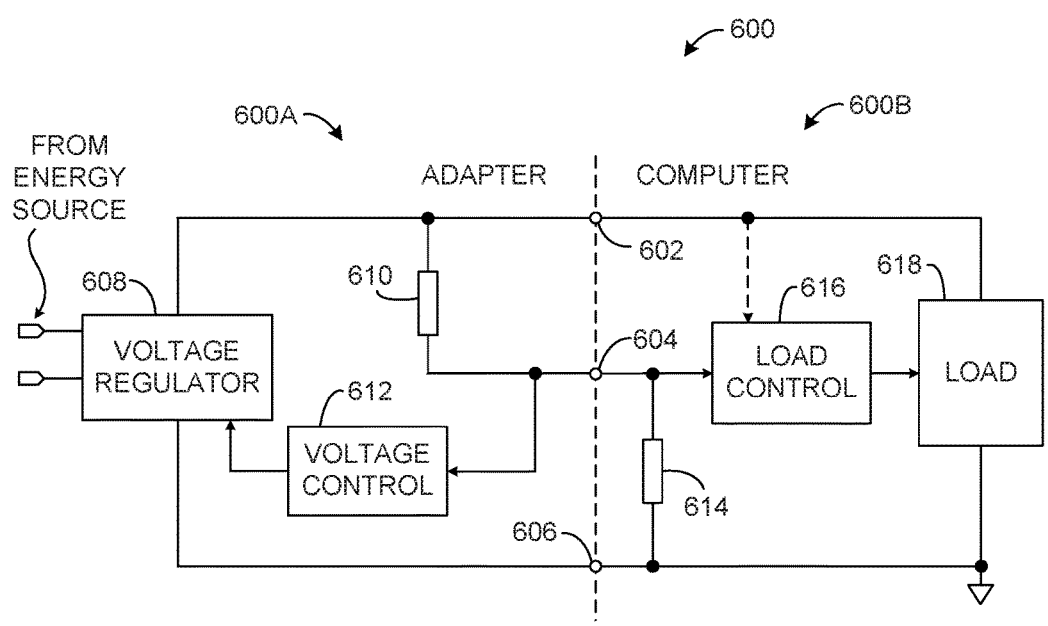
FIG. 6 depicts a schematic diagram of circuitry according to another example.

FIG. 6 is a schematic diagram depicting circuitry 600 according to another embodiment of the present teachings. The circuitry 600 is illustrative and non-limiting in nature. Other circuitry consistent with the present teachings is also contemplated. The circuitry 600 includes a portion 600A that is provided (i.e., supported or housed) within an electrical adapter (ADAPTER), and a portion 600B that is provided within a laptop computer (COMPUTER). Thus, the circuitry 600 is as depicted when an electrical adapter (e.g., 104) is (removably) coupled to a laptop computer (e.g., 102) or other load device in accordance with the present teachings.

The circuitry portions 600A and 600B are referred to as "compatible" with each other by virtue of their cooperative configurations. Thus, the electrical adapter portion 600A is compatible with the laptop computer (or load) portion 600B, and vice versa.

The circuitry 600 includes a power node 602, a signal node 604 and ground node 606. During normal operation, a regulated direct-current voltage is provided between the nodes 602 and 606. The adapter portion 600A includes a voltage regulator 608 to provide a selectable (adjustable), regulated supply voltage between the power node 602 and the ground node 606. The voltage regulator 608 is controllably adjusted by way of voltage control signal described hereinafter. The voltage regulator 608 can be defined, at least in part, by a switching-type regulator, a linear-type regulator, or other suitable voltage control circuitry. The voltage regulator 608 is configured to be coupled to a source of electrical energy such as a line-level utility supply (e.g., one-hundred twenty volts AC).

The adapter portion 600A also includes a resistor 610 coupled (or connected) to the power node 602. The resistor 610 is also referred to as a power capacity resistor 610 for purposes herein. The power capacity resistor 610 is coupled (or connected) to the signal node 604. The power capacity resistor 610 is characterized by an electrical resistance value that corresponds to a power provisioning capacity or current supplying capacity of the adapter portion 600A. Various suitable resistance values can also be used for the power capacity resistor 610 such as, without limitation, those described above in regard to Table 500.

The adapter portion 600A further includes a voltage controller 612. The voltage controller 612 is configured to detect (monitor, or sense) a voltage signal present at the signal node 604 and to correlate that signal with a voltage requirement of the laptop computer 600B. The voltage controller 612 is also configured to provide a voltage control signal to the voltage regulator 608 causing it to provide a supply voltage at the node 602 corresponding (equal, or about equal) to the voltage requirement of the laptop computer 600B.

The voltage controller 612 can be defined by or include any suitable electronic constituency. Without limitation, the voltage controller 612 can be at least partially defined by an application specific integrated circuit (ASIC), a microcontroller, a microprocessor, analog or digital or hybrid circuitry, and so on. Other elements or configurations can also be used.

The computer portion 600B of the circuitry 600 includes a resistor 614 that is connected between the signal node 604 and the ground node 606. The resistor 614 is also referred to as a programming resistor 614 for purposes herein. The programming resistor 614 is characterized by an electrical resistance value that corresponds to a voltage requirement of the computer portion (i.e., load entity or device) 600B. Various suitable resistance values can also be used for the programming resistor 614 such as, without limitation, those described above in regard to Table 400.

The computer portion 600B also includes a load controller 616. The load controller 616 is configured to detect a voltage signal present at the signal node 604 and to correlate that signal with a power (or current) provisioning capacity of the adapter portion 600A. The load controller 616 is also configured to provide a load control signal causing a load device 618 to limit its power consumption (i.e., current draw) from the adapter portion 600A in accordance with the adapter capacity. The load controller 616 is configured such that the power capacity signal is detected when the power capacity resistor 610 is coupled to the signal node 604. Optionally, the load controller 616 is also coupled to monitor a voltage present at the power node 602 and to modulate the load control signal accordingly.

The load controller 616 can be defined by or include any suitable electronic constituency. Without limitation, the load controller 616 can be at least partially defined by an application specific integrated circuit (ASIC), a microcontroller, a microprocessor, analog or digital or hybrid circuitry, and so on. Other elements or configurations can also be used.

The computer portion 600B further includes the load device 618 introduced above. The load device 618 is coupled to receive operating power from the power node 602 and the ground node 606. The load device 618 can be variously defined and can include a motherboard of a laptop computer, a peripheral or peripherals of a computer, an electronic display, data acquisition circuitry, control instrumentation, and so on. Other load devices 618 can also be defined and used. The load device 618 is configured to perform various operations in accordance with its respective normal functions. The load device 618 is also configured to control (throttle, or modulate) its operations, or intensities of those operations, in accordance with the load control signal from the load controller 618. Electrical current draw (power consumption) by the load device 618 is thus limited or constrained in accordance with the power provisioning capacity of the adapter portion 600A.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. A power adapter comprising:
   a voltage regulator;
   first and second resistors;
   a switch to alternately connect the first and second resistors to a signal node coupled to a load circuit external of the power adapter, the switch to connect the first resistor to the signal node to set a first mode of operation, and the switch to connect the second resistor to the signal node to set a second mode of operation; and
   a voltage controller to:
      control the switch to set the first mode of operation, and responsive to the switch setting the first mode of operation, determine a power requirement of the load circuit, and control the voltage regulator to provide a supply voltage to a power node in accordance with the power requirement of the load circuit, and
      control the switch to set the second mode of operation that causes the load circuit to determine a power rating of the power adapter and to operate a load of the load circuit according to the power rating of the power adapter.

2. The power adapter of claim 1, wherein the voltage controller is to selectively set the switch to a first state to connect the first resistor to the signal node and disconnect the second resistor from the signal node to provide the first mode of operation, and to selectively set the switch to a second state to connect the second resistor to the signal node and disconnect the first resistor from the signal node.

3. The power adapter of claim 1, wherein the second resistor is characterized by an electrical resistance correlated to a power capacity of the power adapter.

4. The power adapter of claim 1, wherein each of the first and second resistors is connected between the power node and the signal node.

5. The power adapter of claim 1, wherein the voltage controller is to, responsive to the switch setting the first mode of operation:
   sense a voltage at the signal node that is a node of a voltage divider including the first resistor and a resistor of the load circuit, and
   determine the power requirement of the load circuit based on the sensed voltage.

6. The power adapter of claim 5, wherein the resistor of the load circuit is characterized by an electrical resistance correlated to a voltage required by the load circuit.

7. The power adapter of claim 5, wherein the voltage controller is to use the sensed voltage to access a lookup table to determine the power requirement of the load circuit.

8. An electronic device comprising:
   a load circuit comprising a load; and
   a power circuit comprising:
      a voltage regulator;
      a power node and a signal node, the signal node coupled to the load circuit;
      first and second resistors between the power node and the signal node; and
      a switch to alternately connect the first and second resistors to the signal node, the switch to connect the first resistor to the signal node to set a first mode of operation, and the switch to connect the second resistor to the signal node to set a second mode of operation; and
      a voltage controller to control the switch to set the first mode of operation, and responsive to the switch setting the first mode of operation, determine a power requirement of the load circuit, and control the voltage regulator to provide a supply voltage to the power node in accordance with the power requirement of the load circuit,
   wherein the load circuit is responsive to the switch set to the second mode of operation to determine a power capacity of the power circuit and to operate the load of the load circuit according to the power capacity of the power circuit.

9. The electronic device of claim 8, wherein the load circuit comprises a load controller to determine the power capacity of the power circuit responsive to the switch set to the second mode of operation.

10. The electronic device of claim 9, wherein the load controller is to provide a load control signal to the load to cause an electrical current drawn by the load circuit to be limited in accordance with the power capacity of the power circuit.

11. The electronic device of claim 10, wherein the load control signal is to cause the load to restrict a power consumption by the load in accordance with the power capacity of the power circuit corresponding to the voltage at the signal node sensed by the load controller.

12. The electronic device of claim 8, wherein responsive to the switch setting the first mode of operation, the voltage controller is to detect a voltage at the signal node and to provide a corresponding voltage control signal to control a supply voltage at the power node, wherein the detected voltage at the signal node is based on a resistance of the first resistor and a resistance of a resistor that is part of the load circuit and external of the power circuit.

13. The electronic device of claim 8, wherein the load circuit comprises a programming resistor connected between the signal node and a ground node, the programming resistor characterized by an electrical resistance correlated to a voltage required by the load circuit.

14. The electronic device of claim 8, wherein the second resistor is characterized by an electrical resistance correlated to a power capacity of the power circuit.

15. A power adapter comprising:
   a voltage regulator;
   first and second resistors;
   a switch to alternately connect the first and second resistors to a signal node coupled to an electronic device external of the power adapter; and
   a voltage controller to:
      selectively control the switch to connect the first resistor to the signal node to set a first mode of operation, and connect the second resistor to the signal node to set a second mode of operation,
      in response to controlling the switch to set the first mode of operation, determine a power requirement of the electronic device, and control the voltage regulator to provide a supply voltage to a power node in accordance with the power requirement of the electronic device, and
      controlling the switch to set the second mode of operation that causes the electronic device to determine a power capacity of the power adapter and to operate a load of the electronic device according to the power capacity of the power adapter.

16. The power adapter of claim 15, wherein in the first mode of operation the first resistor is connected to the signal node and the second resistor is disconnected from the signal node, and wherein in the second mode of operation the first resistor is connected to the signal node and the second resistor is disconnected from the signal node.

17. The power adapter of claim 15, wherein the voltage controller is to selectively set the switch to a first state to connect the first resistor to the signal node and disconnect the second resistor from the signal node to provide the first mode of operation, and to selectively set the switch to a second state to connect the second resistor to the signal node and disconnect the first resistor from the signal node.

18. The power adapter of claim 15, wherein the voltage controller is to, responsive to the switch setting the first mode of operation:
   sense a voltage at the signal node that is a node of a voltage divider including the first resistor and a resistor of the electronic device, and
   determine the power requirement of the electronic device based on the sensed voltage.

* * * * *

UNITED STATES PATENT AND TRADEMARK OFFICE
CERTIFICATE OF CORRECTION

PATENT NO. : 10,162,399 B2
APPLICATION NO. : 15/612711
DATED : December 25, 2018
INVENTOR(S) : Lee Warren Atkinson Page 1 of 1

It is certified that error appears in the above-identified patent and that said Letters Patent is hereby corrected as shown below:

On the Title Page

In Column 2, item (74), Attorney, Agent or Firm, Line 1, delete "HP | Patent" and insert -- HPI Patent --, therefor.

In the Drawings

In sheet 2 of 4, FIG. 3, reference numeral 308, Line 1, delete "COORELATE" and insert -- CORRELATE --, therefor.

In sheet 2 of 4, FIG. 3, reference numeral 314, Line 1, delete "COORELATE" and insert -- CORRELATE --, therefor.

Signed and Sealed this
Nineteenth Day of March, 2019

Andrei Iancu
*Director of the United States Patent and Trademark Office*